United States Patent
El-Batal et al.

(10) Patent No.: US 12,405,854 B2
(45) Date of Patent: Sep. 2, 2025

(54) FAULT-TOLERANT MEMORY APPLIANCE

(71) Applicant: Seagate Technology LLC, Fremont, CA (US)

(72) Inventors: Mohamad El-Batal, Superior, CO (US); Jon D. Trantham, Chanhassen, MN (US); David Jerome Allen, Longmont, CO (US); Matthew Bruce Lovell, Longmont, CO (US); Kevin Lee Van Pelt, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/400,782

(22) Filed: Dec. 29, 2023

(65) Prior Publication Data
US 2024/0220358 A1    Jul. 4, 2024

Related U.S. Application Data

(60) Provisional application No. 63/478,039, filed on Dec. 30, 2022.

(51) Int. Cl.
| | | |
|---|---|---|
| *G06F 11/10* | (2006.01) | |
| *G06F 3/06* | (2006.01) | |
| *H04L 67/2876* | (2022.01) | |
| *H04L 67/289* | (2022.01) | |

(52) U.S. Cl.
CPC ........ *G06F 11/1044* (2013.01); *G06F 3/0614* (2013.01); *H04L 67/2876* (2013.01); *H04L 67/289* (2013.01)

(58) Field of Classification Search
CPC . H04L 67/2876; H04L 67/289; G06F 3/0604; G06F 3/0614; G06F 3/065
USPC ............................. 713/1, 2; 714/763
See application file for complete search history.

(56) References Cited

U.S. PATENT DOCUMENTS

| | | | | |
|---|---|---|---|---|
| 6,842,422 B1 * | 1/2005 | Bianchini, Jr. | ........ | H04Q 11/06 |
| | | | | 714/6.24 |
| 7,079,525 B1 * | 7/2006 | Goldstein | ............. | H04L 49/103 |
| | | | | 370/386 |
| 7,565,566 B2 * | 7/2009 | Davies | ................... | G06F 11/201 |
| | | | | 714/4.5 |
| 8,230,145 B2 * | 7/2012 | Bresniker | ........... | G06F 13/1694 |
| | | | | 370/395.5 |

(Continued)

OTHER PUBLICATIONS

Trick, C. (Dec. 5, 2022). What is Compute Express Link (CXL)?. Blogs by Trenton Systems. https://www.trentonsystems.com/en-us/resource-hub/blog/what-is-compute-express-link-cxl (Year: 2022).*

*Primary Examiner* — Albert Decady
*Assistant Examiner* — Grace V Braden
(74) *Attorney, Agent, or Firm* — HOLZER PATEL DRENNAN

(57) ABSTRACT

The technology disclosed herein provides a memory blade including a plurality of fabric switches configured to receive commands from a plurality of host clients, an address decoder and tracker circuit communicatively connected to the fabric switches and configured to determine the source of commands received at the fabric switches an aggregator crossbar configured to provide bandwidth aggregation between host clients and a plurality of memory modules; and a buffer module configured to couple the commands from the plurality of host clients with the plurality of memory modules.

18 Claims, 5 Drawing Sheets

(56) References Cited

U.S. PATENT DOCUMENTS

| | | | |
|---|---|---|---|
| 2006/0039370 A1* | 2/2006 | Rosen | H04L 49/3018 370/389 |
| 2007/0083723 A1* | 4/2007 | Dey | H04L 61/5061 711/163 |
| 2011/0167304 A1 | 7/2011 | Asbun et al. | |
| 2016/0301718 A1 | 10/2016 | Imbimbo et al. | |
| 2020/0045111 A1* | 2/2020 | Kannan | G06F 3/0604 |
| 2020/0337021 A1 | 10/2020 | Zhang et al. | |
| 2021/0075633 A1 | 3/2021 | Sen et al. | |
| 2021/0160318 A1* | 5/2021 | Sajeepa | H04L 49/15 |
| 2022/0109587 A1* | 4/2022 | Sapio | H04L 1/188 |
| 2022/0222010 A1* | 7/2022 | Bachmutsky | G06F 3/0655 |
| 2022/0237113 A1* | 7/2022 | Woo | G06F 12/0882 |

* cited by examiner

FAULT-TOLERANT MEMORY APPLIANCE

CROSS-REFERENCE TO RELATED APPLICATIONS

This application is a non-provisional application based on and takes priority from U.S. provisional application Ser. No. 63/478,039, entitled "Fault-Tolerant Memory Appliance," which was filed on Dec. 30, 2022. The disclosure set forth in the referenced application is incorporated herein by reference in its entirety.

BACKGROUND

Many organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

As the memory industry moves closer towards external (to server) memory disaggregation in general, the need for fault tolerant memory appliance solutions becomes important. Specifically, because multiple compute nodes with 100's or 1000's of virtual machines (VMs) may be connected to such external disaggregated memory appliance, thus having a single point of failure in the pathway or memory module may result in a significant blast radius that is difficult to absorb within a typical datacenter. As a result, fault tolerant memory appliance with higher level reliability and availability is quite important.

SUMMARY

The technology disclosed herein provides a memory blade including a plurality of fabric switches configured to receive commands from a plurality of host clients, an address decoder and tracker circuit communicatively connected to the fabric switches and configured to determine the source of commands received at the fabric switches, an aggregator crossbar configured to provide bandwidth aggregation between host clients and a plurality of memory modules; and a buffer module configured to couple the commands from the plurality of host clients with the plurality of memory modules.

An alternative implementation of the technology disclosed herein provides a system including a first fabric switch configured to receive a stream of data from one of a plurality of clients, the first fabric switch configured to store the stream of data at one of a first set of dual-ported memory modules, a second fabric switch configured to receive the stream of data from the one of the plurality of clients, the second fabric switch configured to store the stream of data at one of a second set of dual-ported memory modules, wherein the first set of dual-ported memory modules are different from the second set of dual-ported memory modules, wherein each of the first fabric switch and the second fabric switch is configured to dual-cast the stream of data to a paired set of memory modules, the paired set of memory modules including a first memory module from the first set of dual-ported memory modules and a second memory module from the second set of dual-ported memory modules.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

BRIEF DESCRIPTIONS OF THE DRAWINGS

DETAILED DESCRIPTION

Compute Express Link (CXL) is an open industry standard interconnect offering high-bandwidth, low-latency connectivity between host processor and devices such as accelerators, memory buffers, and smart I/O devices. It is designed to address the growing high-performance computational workloads by supporting heterogeneous processing and memory systems with applications in artificial intelligence (AI), machine learning ML), analytics, cloud infrastructure, cloudification of the network and edge, communication systems, and high performance computing (HPC). It does this by enabling coherency and memory semantics on top of the PCI Express® (PCIe®) 5.0 based I/O semantics for optimized performance in evolving usage models. This is increasingly important as processing data in these emerging applications requires a diverse mix of scalar, vector, matrix, and spatial architectures deployed in CPU, GPU, FPGA, smart NICs, and other accelerators.

Storage class memory (SCM), also known as emerging class memory. Storage class memory (SCM) and emerging class memory (ECM) are directed in two aspects: Typically, SCM is non-volatile, it has higher latency than ECM, and can be addressed as block or byte addressable. ECM can be both non-volatile or volatile and is only byte addressable through Load/Store operations and not block driver based. The two are not interchangeable but can be used as different tiers of memory), is used to refer to memory that is typically non-volatile with access speeds faster than that of flash memory and latency in line with DRAM memory. Thus, they may be considered to be in a tier between flash memory/SSDs and DRAM. For example, resistive memory may be used as SCM even though it does not have the retention level. Similarly, spin transfer torque (STT) random access memory retains data for long time and may be also used as SCM.

The technology disclosed herein generally relates to fault tolerant memory appliance solutions. Specifically, the solutions disclosed herein provides automated hardware data replication with low latency impact using multicasting capabilities of (compute express-link) CXL switches. Here multicasting refers to a client writing data to n ports. For example, dual-casting may refer to writing data to 2 ports, or to two different devices within the same address space. The solutions apply to storage class memory (SCM) where a client is able to multicast by writing into two address ranges simultaneously. In case a failure is detected, on one of the two address ranges, the client is able to access the full range of data from the alternative address range. In some implementations, due to the use of the CXL, the client is unaware that it is writing data to two address ranges on two memory devices as it sees only one instantiation of the CXL switch.

Figure 1:
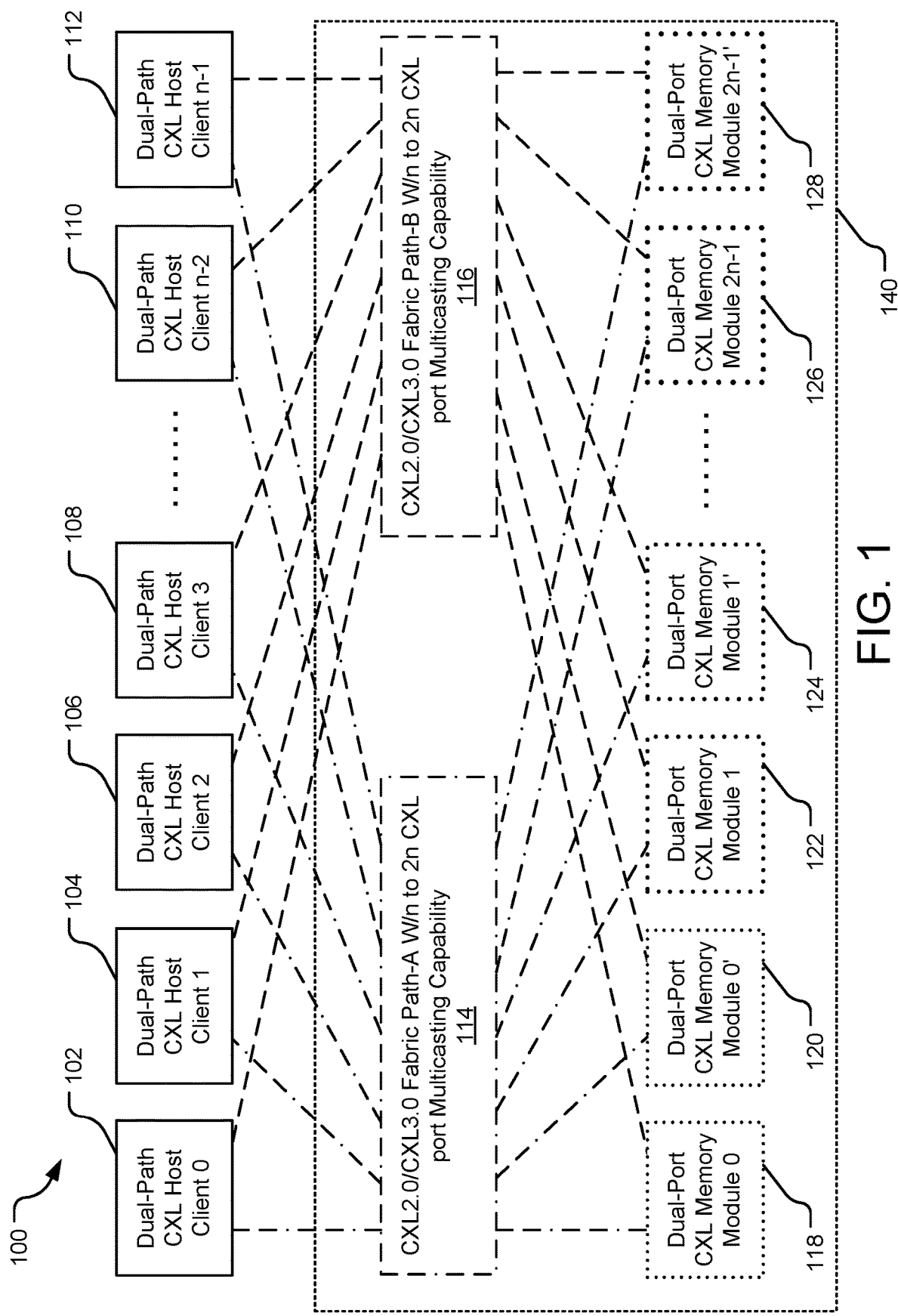
FIG. 1 illustrates an example block diagram of a fault-tolerant data memory system providing data replication redundancy.

FIG. 1 illustrates a block diagram of a fault-tolerant memory system 100 providing full path and data replication redundancy. The system 100 includes a plurality of host clients 102-112 that are communicatively connected to a first fabric path 114 and a second fabric path 116. The first fabric path 114 may also be referred to as the first fabric switch 114 or a first aggregator 114 and it may be implemented using a CXL switch. Similarly, the second fabric path 116 may also be referred to as the second fabric switch 116 or a second aggregator 116 and it may also be implemented using a CXL switch.

Each of the host clients 102-112 is a dual root port capable client. Each dual root port capable client is communicatively connected to a root port of the first fabric path 114 and a root port of the second fabric path 116. The root ports on the fabrics 114 and 116 are selected ports with the least path cost to reach their relative root bridge on their respective fabrics. Each of the fabric paths 114 and 116 are communicatively connected to any of 2n memory modules 118-128, where n is the number of total host clients 102-112. Therefore, the fabric paths 114 and 116 are also referred to as aggregators 114 and 116. Specifically, each of the 2n memory modules 118-128 may be a dual-port CXL memory module wherein each port of each memory module 118-128 can communicate with a CXL switch, such as the CXL switches 114 and 116.

The system 100 provides full path data replication by providing each of the host clients 102-112 dual paths to each of the memory modules 118-128. Specifically, each of the host clients 102-112 sees each of the memory modules 118-128 twice, in the address space of the fabric path 114 and in the address space of the fabric path 116. As a result, each of the client can decide to divide a writing along two paths. In one implementation, the memory modules 118-128 and the fabric paths 114 and 116 may be combined to form a combined multi-ported memory device 140.

For example, client 102 can decide to divide writing along the two paths using the fabric 114 as well as using the fabric 116, referred to a multi-pathing and therefore, use throughput of both paths. This allows the client 102 to split writing into two address ranges. For example, the client 102 can decide that address range 0 is from 0 to n−1, address range 1 is n to 2n−1, etc. The client 102 can also write simultaneously to both ranges until a failure happens (say for example, a switch fails or a cable is pulled). This allows the client 102 to access the full range of memory modules 118-128 twice—giving full redundancy. For example, the client 102 may not know that it has two memory devices 118 and 120, as it may see only one instantiation on each fabric pathways 114 and 116. In this case, the client 102 sees bytes 0-10 as being visible from both fabric pathways 114 and 116. It may divide bytes 0-4 to memory the fabric pathway 114 and bytes 5-10 to the fabric pathway 116. In case the fabric pathway 114 fails, the host 102 tries to access using 116 and it still succeeds as the fabric pathway 116 also has access to the memory modules 118-128.

As a result of the full redundancy, any of the n host clients 102-112 has access to any of the 2n memory modules 118-128 via their dual-end-point-ports through the redundant CXL2.0/3.0 switching fabric pathways 114 and 116. Specifically, the switching fabric pathways 114 and 116 provide n+1 the number of connections to the n+1 end-point memory modules 118-128 from the n host clients 102-112. As a result, all host clients 102-112 can use both of their available root-ports bandwidth simultaneously to access their assigned dual-ported pair of memory modules from the end-point memory modules 118-128 across the redundant fabric pathways 114 and 116. As discussed above, the fabric pathways 114 and 116 may use their multicasting capability to dual-cast any specific stream of data from any n host clients 102-112 and replicate it to a paired set of identically sized redundant memory modules 118-128. The data can then be read back to the host from any of the available memory modules 118-128. In such an implementation, the loss of any of the memory modules 118-128 does not cause any reduction of bandwidth from and to any host clients 102-112.

Figure 2:
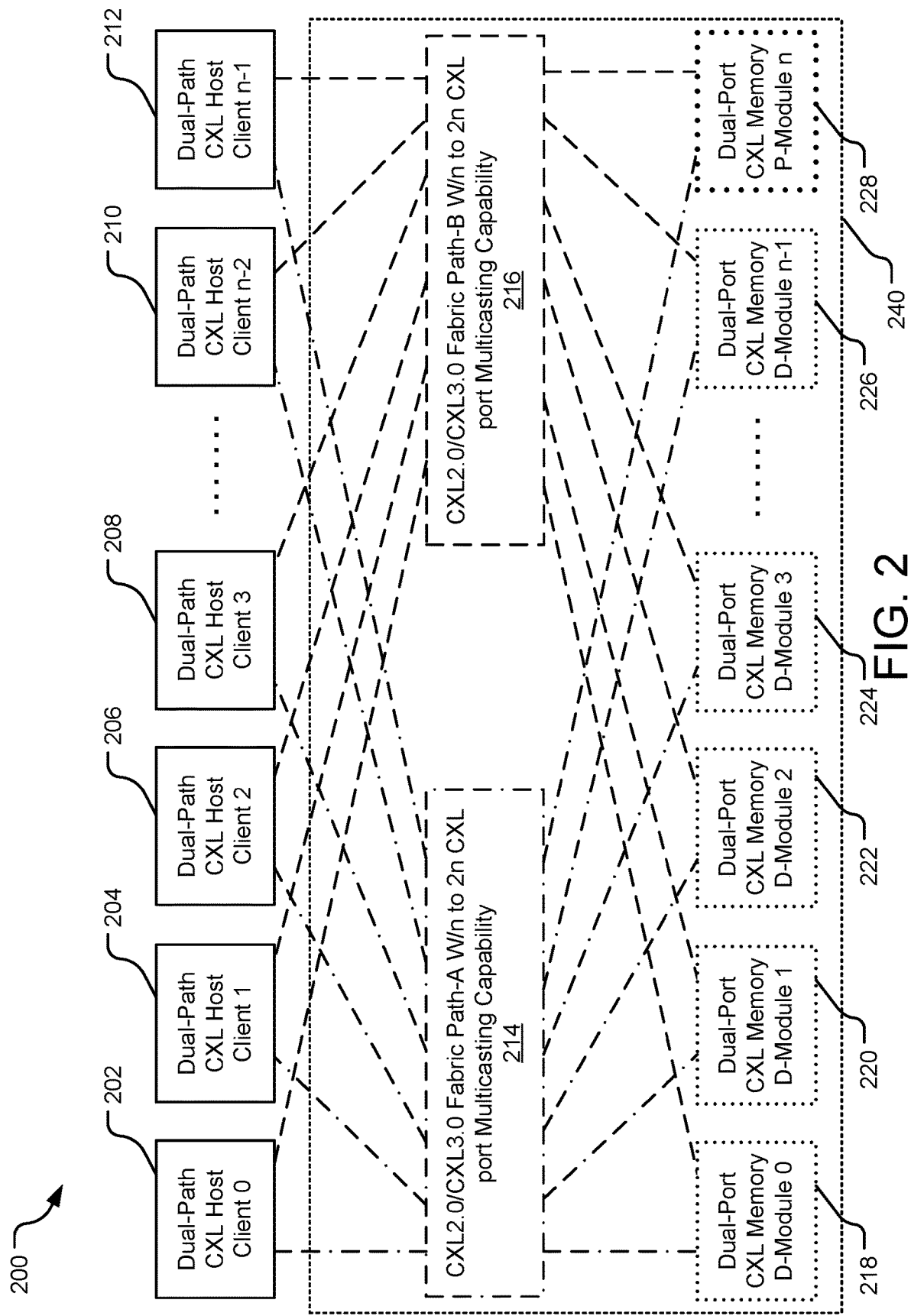
FIG. 2 illustrates an example block diagram of an alternative fault-tolerant data memory system including data ECC protection.

FIG. 2 illustrates a block diagram of an alternative fault-tolerant memory system 200 including full path and data error correction code (ECC) redundancy. The fault-tolerant memory system 200 is configured with a plurality of host clients 202-212 that are communicatively connected to a first fabric path 214 and a second fabric path 216. The first fabric path 214 may also be referred to as the first fabric switch 214 or a first aggregator 214 and it may be implemented using a CXL switch. Similarly, the second fabric path 216 may also be referred to as the second fabric switch 216 or a second aggregator 116 and it may also be implemented using a CXL switch.

Just as with the system 100, the system 200 provides full path data replication by providing each of the host clients 202-212 dual paths to each of data (D)-memory modules 218-226 and a parity (P) memory module 228 (together referred to as memory module 218-228. Specifically, each of the host clients 202-212 sees each of the memory modules 218-228 twice, in the address space of the fabric path 214 and in the address space of the fabric path 216. As a result, each of the client can decide to divide a writing along two paths. In one implementation, the memory modules 218-228 and the fabric paths 214 and 216 may be combined to form a combined multi-ported memory device 240.

As a result of the full redundancy, any of the n host clients 202-212 has access to any of the 2n memory modules 218-228 via their dual-end-point-ports through the redundant CXL2.0/3.0 switching fabric pathways 214 and 216. However, compared to the fault-tolerant memory system 200, in the fault-tolerant memory system 200, the switching fabric pathways 214 and 216 provide 2× the number of connections to the 2× end-point memory modules 218-228 from the n host clients 202-212. Furthermore, all n host clients 202-212 can use both of their available root-ports bandwidth simultaneously to access their assigned dual-ported pair of memory modules from the end-point memory modules 218-228 across the redundant fabric pathways 214 and 216.

In one implementation, the fabric pathways 214 and 216 can be designed to stripe any specific stream of data from any of the n host clients 202-212 to the n (D) memory modules 218-226 of identically sized memory modules while adding inline generated ECC Parity information to the (P) memory module 228. The data may be read back to the n host clients 202-218 from all available (D) memory modules and checked against the (P) ECC parity memory module 228, and re-corrected from the parity if the check fails. In such an implementation, the loss of any of the (D) memory modules 218-226 does not cause any reduction of bandwidth from and to any host clients 202-212.

Figure 3:
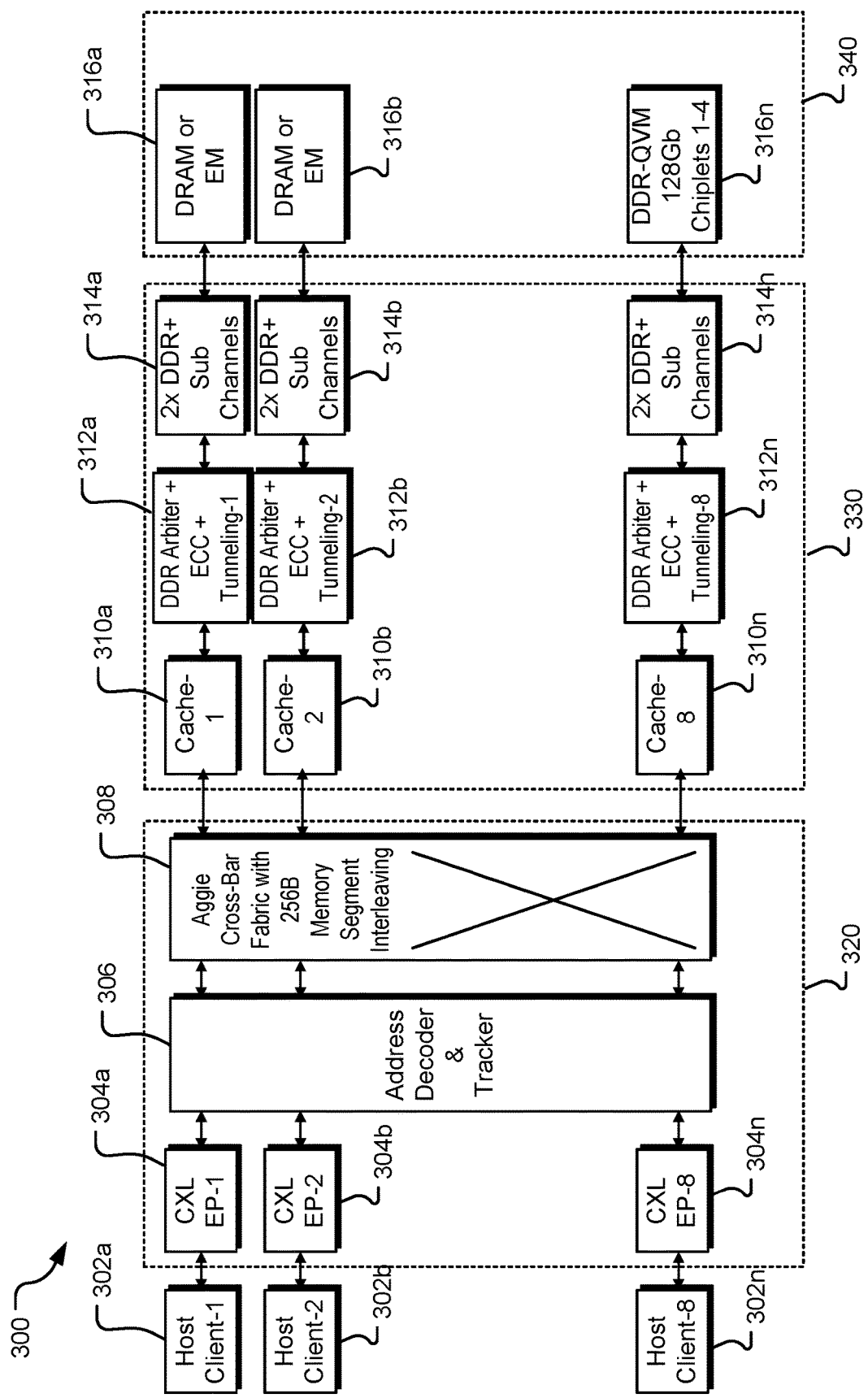
FIG. 3 illustrates an example block diagram of an implementation of a CXL attached memory blade configuration that includes a multi-ported memory that combines memory modules with a fabric switch.

FIG. 3 illustrates a block diagram of a CXL attached memory blade configuration 300 that includes a multi-ported memory that combines memory modules with a fabric switch. Specifically, the implementation disclosed herein includes a multi-ported memory that combines memory modules with a fabric switch. The memory blade 300 may communicate with a number of host clients 302. While the illustrated implementation shows 8 host clients 302a-302n, in alternative implementation n+1 host clients 302 may communicate with the memory blade 300 with n being at least one. For example, the host clients 302 may include an infrastructure management client, a virtual machine client, etc.

The memory blade 300 includes an aggregator module 320 and a logic functions module 330. The aggregator module 320 may include a large number of CXL endpoints (EPs) 304. Specifically, as illustrated, the aggregator module 320 includes n CXL EPs 304, with each of the n CXL EPs 304 communicating with a host client 302. The aggregator module also includes an address decoder & tracker circuit 306 and an interleaving module 308.

The address decoder & tracker circuit 306 may be configured to determine and track the source of the commands received at the CXL EPs 304. For example, a command received at the CXL EP-2 304b may be from a host client 302b. The command, with the information about its source, is presented to the interleaving circuit 308. The interleaving circuit 308 may provide memory segment interleaving. For example, in one implementation, the interleaving circuit 308 may provide bandwidth aggregation from four host clients 302 to two memory modules. Alternatively, the interleaving may be from 8 host clients 302 to two storge modules, etc. The interleaving module 308 may use a 256B interleaving granularity and use an interleaving algorithm to map between the host clients and the memory modules.

The aggregator fabric 308 presents a window of memory from a bank of multi-ported memory modules 340 to the host clients 302. The incoming command from the host clients 302 may include 64 byte payloads. An implementation of the CXL attached memory blade configuration 300 includes a buffer module 330 between the aggregator module 320 and the multi-ported memory modules 340. The buffer module 330 may include a number of cache 310 that are used to cache the 64 byte payload from the incoming commands.

The buffer module 330 also includes a series of double data rate (DDR) arbiters 312 and DDR subchannels 314. For example, the DDR arbiters 312 may be DDR4 arbiters, DDR5 arbiters, etc. The DDR arbiters 312 may select the payload and/or memory access requests from the cache 310 based on a number of criteria, and provides selected payload and/or memory access requests to DDR subchannels 314.

Furthermore, the DDR arbiters 312 may also provide error correction code (ECC) calculations for the payload from the cache 310. In one implementation, the DDR arbiters 312 couple the memory access requests to 2×DDR subchannels 314. Subsequently, the 2×DDR subchannels 314 couples with a payloads to the bank of multi-ported memory modules 340. In one implementation, the 2×DDR subchannels 314 may be 2×DDR5 subchannels.

The memory blade 300 may be configured as an array of eight composable and disaggregated high-capacity and high-bandwidth CXL attached memory expansion blades appliance. The memory blade 300 enables scaling memory capacity and bandwidth outside the host servers and independent of the host server and connects across a number of host servers within a scale-out server cluster. This configuration enables the datacenter infrastructure to use basic low memory configured host servers to minimize cost and expand their memory footprint on an as needed and temporal bases. Typically expanding memory within a single bare-metal host server or host client can lead to stranded unused memory capacity during application down-time periods. The configuration of the memory blade 300 enables clustering multiple host servers/clients with a single layer of controller silicon latency. Compared to this, previous arrangements for expanding memory capacity require at least two layers of controller and switch level of silicon, and therefore have twice the latency compared to the latency of the memory blade 300.

Figure 4:
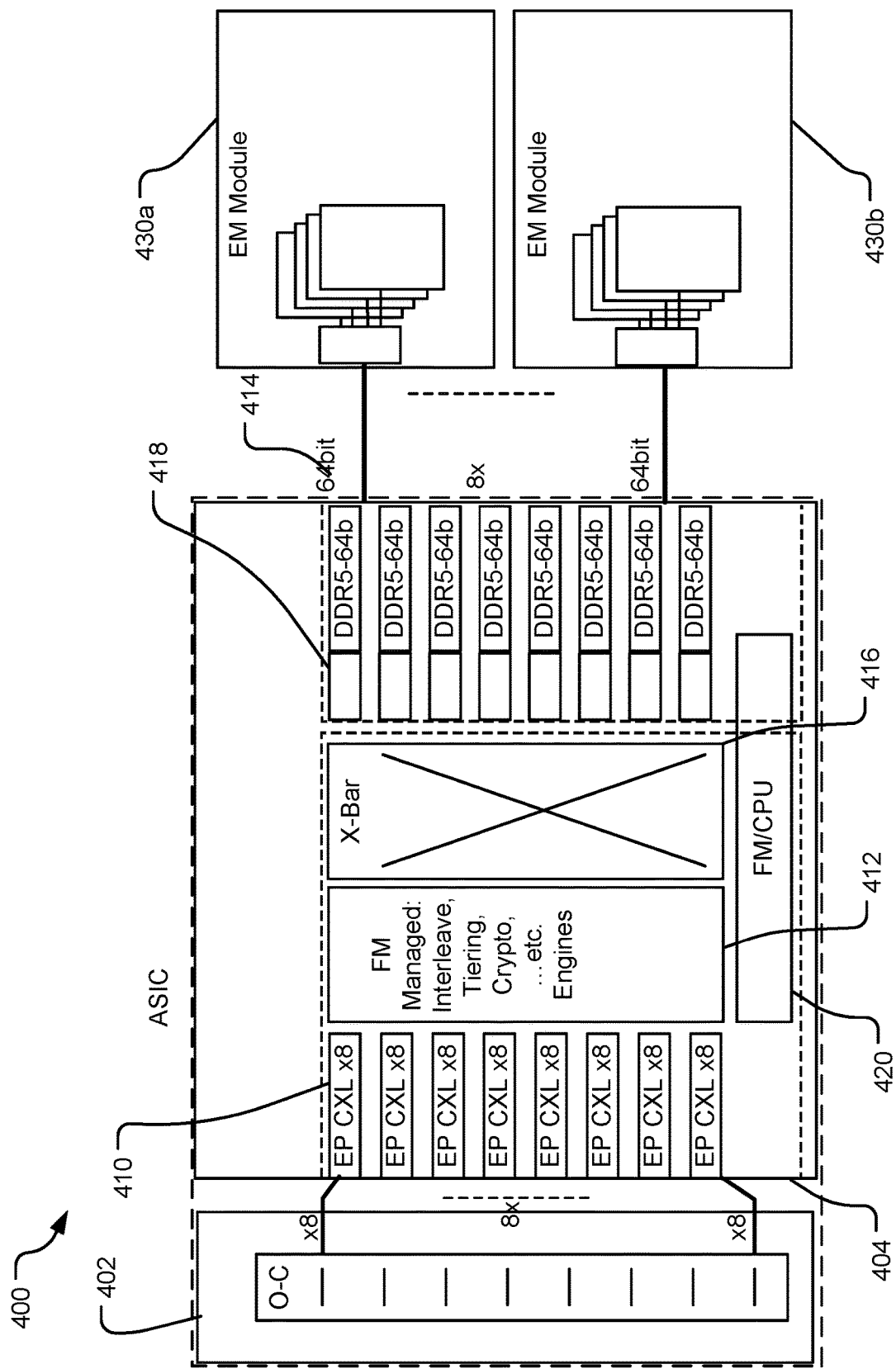
FIG. 4 illustrates an example block diagram of an alternative implementation of a CXL attached memory blade configuration that includes a multi-ported memory that combines memory modules with a fabric switch.

FIG. 4 illustrates a block diagram of an alternative implementation of a CXL attached memory blade configuration 400 that includes a multi-ported memory that combines memory modules with a fabric switch. The memory blade 400 may include a connector cable 402 that couples a number of host clients to a fabric manager (FM) 404 that couples the host clients to one or more memory modules 430. The FM 404 may include a number of CXL endpoints 410, an interleaving engine 412, a crossbar 416, and a number of DDR subchannels 418. The crossbar 416 may include an interleaving circuit that provides bandwidth aggregation from host clients to memory modules. Typically, the memory interleaving is managed by the CXL fabric manager (FM) and it takes place inline without adding signification latencies.

In the illustrated implementation, there are eight CXL endpoints coupling eight host clients to the memory modules, however, in alternative implementations, alternative number of couplings may be provided. The interleaving engine 412 may also perform other functions such as data tiering, cryptography, etc. The DDR subchannels 418 may be DDR5 subchannels that are connected to the memory modules 430 using 64 bit connectors 414. A CPU 420 for the FM 404 may manage various modules of the FM 404. In one implementation, various components of the FM 404 may be configured using application specific integrated circuit (ASIC) architecture. The memory modules 430 may be emerging memory modules or they may use conventional memory such as magnetic memory, optical memory, etc.

Figure 5:
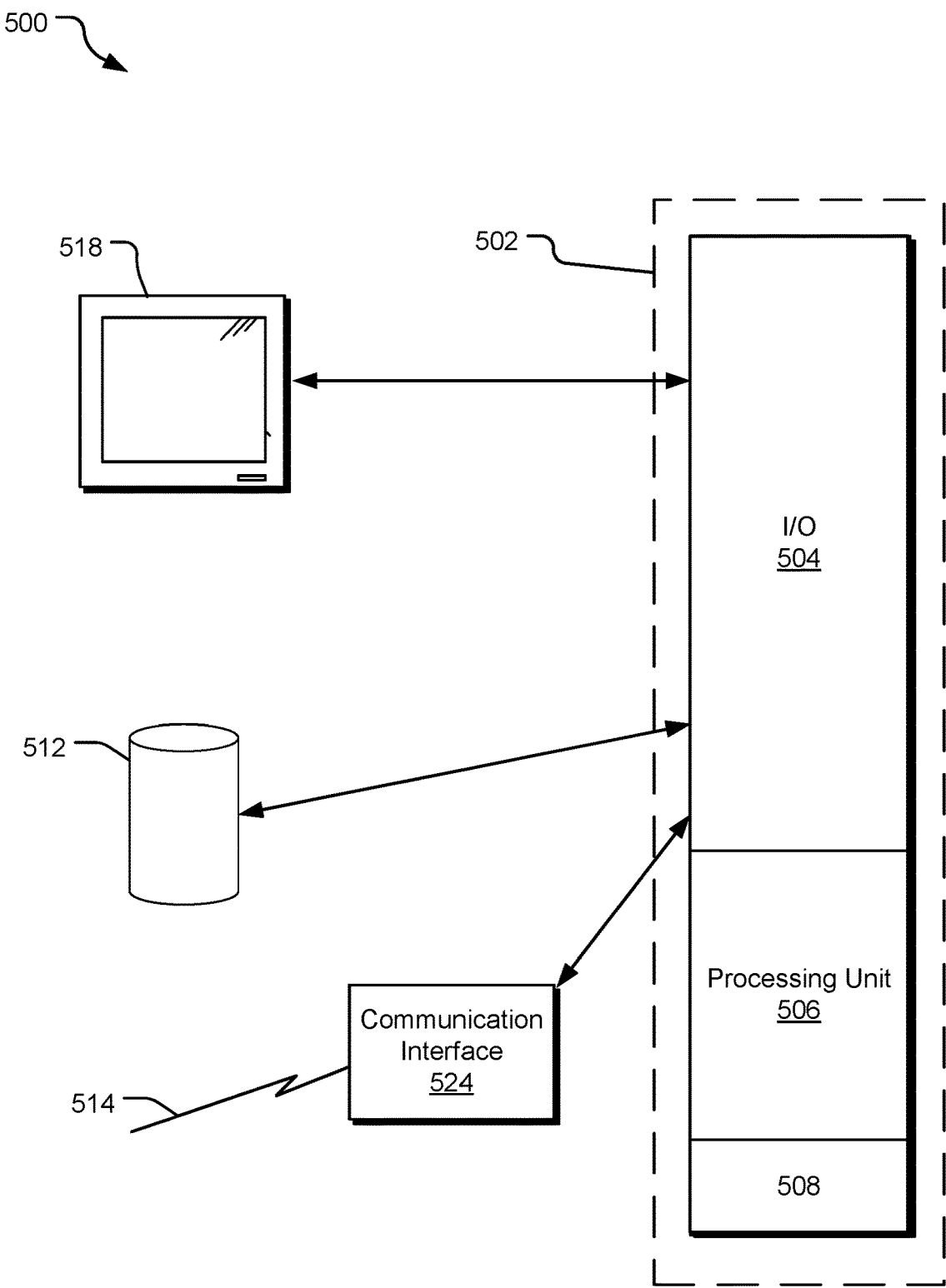
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable memory medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a memory unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a memory unit 512. Computer program products containing mechanisms to effectuate the systems and methods in accordance with the described technology may reside in the memory section 508 or on the memory unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the memory unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the memory unit 512 and executed by the processor 502.

The processing system 500 may be implemented in a device, such as a user device, memory device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible memory device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable memory media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system, comprising:
a first fabric switch configured to receive a stream of data from one of a plurality of clients, the first fabric switch configured to store the stream of data at one of a first set of dual-ported memory modules;
a second fabric switch configured to receive the stream of data from the one of the plurality of clients, the second fabric switch configured to store the stream of data at one of a second set of dual-ported memory modules, wherein the first set of dual-ported memory modules are different from the second set of dual-ported memory modules; and
a buffer module configured to couple commands from the plurality of clients with the first set of dual-ported memory modules and the second set of dual-ported memory modules, wherein the buffer module comprises:
a plurality of caches to store payloads from an aggregator crossbar,
a plurality of DDR subchannels, and
a plurality of DDR arbiters configured to select payload from the plurality of cache and provide the selected payloads to one of the plurality of DDR subchannels; and
wherein each of the first fabric switch and the second fabric switch is configured to dual-cast the stream of data to a paired set of memory modules, the paired set of memory modules including a first memory module from the first set of dual-ported memory modules and a second memory module from the second set of dual-ported memory modules.

2. The system of claim 1, wherein the first memory module from the first set of dual-ported memory modules and the second memory module from the second set of dual-ported memory modules are similar in size.

3. The system of claim 1, wherein each of the first fabric switch and the second fabric switch are configured to multi-cast the stream of data using compute express-link (CXL).

4. The system of claim 1, wherein each of the first fabric switch and the second fabric switch are configured to communicate with the plurality of clients using PCI express (PCIe) communication interface.

5. The system of claim 1, wherein each of the plurality of clients is a dual-port client.

6. The system of claim 5, wherein each of the plurality of clients being configured to use two of its dual root-ports bandwidths simultaneously to communicate with the first fabric switch and the second fabric switch.

7. The system of claim 1, wherein each of the first fabric switch and the second fabric switch are configured to stripe the stream of data to the first set of dual-ported memory modules and add parity information for the stream of data to a parity memory module.

8. The system of claim 7, wherein each of the first fabric switch and the second fabric switch are configured to generate the parity information about a stripe of data using error correction code (ECC) parity.

9. A memory blade, comprising:
a plurality of fabric switches configured to receive commands from a plurality of host clients;
an address decoder and tracker circuit communicatively connected to the fabric switches and configured to determine the source of commands received at the fabric switches;
an aggregator crossbar configured to provide bandwidth aggregation between host clients and a plurality of memory modules; and
a buffer module configured to couple the commands from the plurality of host clients with the plurality of memory modules, wherein the buffer module further comprises:
a plurality of caches to store payloads from the aggregator crossbar;
a plurality of DDR subchannels; and
a plurality of DDR arbiters configured to select payload from the plurality of cache and provide the selected payloads to one of the plurality of DDR subchannels.

10. The memory blade of claim 9, wherein the plurality of fabric switches are CXL fabric switches.

11. The memory blade of claim 9, further comprising a plurality of DDR tunneling circuits, wherein each of the plurality of DDR tunneling circuit couples a cache with a subchannel.

12. The memory blade of claim 9, wherein the plurality of memory modules are at least one of DRAM memory modules and emerging memory modules.

13. The memory blade of claim 9, wherein the plurality of DDR subchannels are at least one of DDR4 subchannels and DDR5 subchannels.

14. The memory blade of claim 9, wherein the aggregator crossbar is further configured to interleave payloads from two or more host clients to one cache.

15. A memory appliance, Comprising:
a first fabric switch configured to receive a stream of data from one of a plurality of clients, the first fabric switch configured to store the stream of data at one of a first set of dual-ported memory modules;
a second fabric switch configured to receive the stream of data from the one of the plurality of clients, the second fabric switch configured to store the stream of data at one of a second set of dual-ported memory modules, wherein the first set of dual-ported memory modules are different from the second set of dual-ported memory modules, wherein each of the first fabric switch and the second fabric switch is configured to dual-cast the stream of data to a paired set of memory modules, the paired set of memory modules including a first memory module from the first set of dual-ported memory modules and a second memory module from the second set of dual-ported memory modules;
an aggregator crossbar configured to provide bandwidth aggregation between the first and the second fabric switch and the first and the second sets of dual-ported memory modules; and
a plurality of arbiters configured to select the payloads from a plurality of caches and couple them to one of a plurality of DDR subchannels.

16. The memory appliance of claim 15, further comprising a buffer module configured to couple payloads from the first and the second fabric switches with the first and the second sets of dual-ported memory modules.

17. The memory appliance of claim 16, wherein the buffer module comprising the plurality of caches configured to store the payloads from the first and the second fabric switches.

18. The memory appliance of claim 15, wherein each of the plurality of DDR subchannels is a DDR5 subchannel.

* * * * *